United States Patent [19]

Olson et al.

[11] Patent Number: 4,882,190

[45] Date of Patent: Nov. 21, 1989

[54] METHOD OF PRODUCING SULFITE-FREE SUGARBEET PULP

[75] Inventors: Roland F. Olson, Fargo, N. Dak.; Richard R. Fergle, Moorhead, Minn.

[73] Assignee: American Crystal Sugar Company, Moorhead, Minn.

[21] Appl. No.: 130,086

[22] Filed: Dec. 8, 1987

[51] Int. Cl.$^4$ .................. A23B 7/00; A23B 7/10; A23J 1/14

[52] U.S. Cl. .................. 426/541; 426/267; 426/270; 426/615; 426/623; 426/635; 162/10; 162/99; 162/150; 162/160

[58] Field of Search ............ 426/258, 259, 640, 431, 426/253, 256, 251, 429, 658, 615, 74, 267, 270, 623, 635, 541; 162/91, 99, 10, 160, 150; 127/43, 44

[56] References Cited

U.S. PATENT DOCUMENTS

| | | | |
|---|---|---|---|
| 1,448,512 | 3/1923 | Benjamin . | |
| 2,191,835 | 2/1940 | Snelling | 426/615 |
| 2,801,940 | 8/1957 | Stark | 127/44 |
| 2,807,560 | 9/1957 | Brownell | 127/43 |
| 3,347,705 | 10/1967 | Jung | 127/44 |
| 3,734,773 | 5/1973 | Haley | 127/46.1 |
| 3,895,119 | 7/1975 | Grom | 426/270 |
| 4,241,093 | 12/1980 | Farag et al. | 426/258 |
| 4,273,590 | 6/1981 | Cronewitz | 127/43 |
| 4,326,892 | 4/1982 | Madsen | 127/43 |
| 4,451,489 | 5/1984 | Beale et al. | 426/254 |
| 4,555,270 | 11/1985 | Ponant | 127/44 |
| 4,795,653 | 1/1989 | Bommarito | 426/615 |
| 4,818,549 | 4/1989 | Steiner | 426/270 |

FOREIGN PATENT DOCUMENTS

| | | |
|---|---|---|
| 2238016 | 2/1974 | Fed. Rep. of Germany . |
| 224484 | 7/1985 | German Democratic Rep. . |

OTHER PUBLICATIONS

K. L. Kapur et al., *Indian Food Packer*, 40 (1977).
*Food Engineering*, 83 (1986).
The article New Technology Produces. . . Sugarbeet Fiber in the Sep. 1987 issue of "Food Engineering".

*Primary Examiner*—Carolyn Paden
*Attorney, Agent, or Firm*—Merchant, Gould, Smith, Edell, Welter & Schmidt

[57] ABSTRACT

A method of producing sulfite-free sugarbeet pulp involving contacting sugarbeet pieces with a sulfite-free aqueous solution containing a non-sulfite antioxidant composition containing sodium erythorbate, calcium chloride, araboascorbic acid, citric acid, trisodium citrate, and mixtures thereof.

11 Claims, No Drawings

METHOD OF PRODUCING SULFITE-FREE SUGARBEET PULP

FIELD OF THE INVENTION

Our invention relates generally to a method of processing sugarbeets to form a high-fiber, sulfite-free food supplement.

BACKGROUND OF THE INVENTION

Studies show that an increase in the consumption of dietary fiber can be beneficial to one's health in terms of decreasing the risk of developing some forms of cancer, decreasing the level of blood cholesterol and other like benefits. These studies have increased the demand for high-fiber foods as many individuals have begun adding high-fiber foods to their diet. In response to the increasing demand for high-fiber foods, food processors are increasing the fiber content of processed foods by adding high fiber supplements such as bran, citrus peels, apple pumace, sawdust, and the like. For various reasons, bran is by far the most commonly used fiber source.

Recent developments in the sugarbeet industry have added sugarbeet fiber to the list of high-fiber supplements which may be added to processed foods to increase their fiber content. Sugarbeet fiber can be processed to an aesthetically pleasing, odorless, off-white, bland, low calorie powder which is high in both soluble and insoluble dietary fiber and has good moisture retention.

The sugarbeet is a form of the common beet Beta Vulgaris which is commercially grown in large quantities and processed for its sugar content. While dependent upon the particular species and growing conditions, whole mature sugarbeets typically consist of about 70-80 wt-% water, 14-20 wt-% sugar, 1-2 wt-% pectin, and minor amounts of other components such as amino acids, minerals, etc. The portion of the sugarbeet remaining after commercial extraction of the sugar is known as sugarbeet pulp.

Until recently, sugarbeet pulp has generally been sold only as livestock feed. However, recent developments have resulted in sugarbeet pulp which may be sold as a human dietary food supplement. To achieve sugarbeet pulp fit for human consumption, it is necessary to process the sugarbeet pulp by removing impurities such as sand, soil, rocks and silt which are not typically removed during normal processing.

Sulfites, typically sulfur dioxide, are commonly used at various stages in sugarbeet processing to enhance the diffusion of sugar from the sugarbeet cossettes; to reduce the pH of the water in the diffuser and the pulp press in order to achieve optimum pulp pressing results; to reduce the number and activity of microorganisms in the system and to prevent oxidative discoloration of the cossettes and pulp.

Substantially all of the sulfite employed in the processing of sugarbeets is absorbed by and retained in the sugarbeet pulp while little sulfite is absorbed by and retained in the sugar containing juice. In the past, the utilization of sulfites in the processing of sugarbeets has not posed a problem as the sulfite-containing sugarbeet pulp was sold only as livestock feed while only the substantially sulfite-free extracted sugar was sold for human consumption. However, recent concerns over the possibility of adverse side effects created by the ingestion of sulfites has led to a dramatic decline in the use of sulfites on foods intended for human consumption and recent advances in the processing of sugarbeet pulp have resulted in sugarbeet pulp suitable for use as a high-fiber human dietary supplement.

Accordingly, a need exists for a method of producing sulfite-free sugarbeet pulp which maintains sufficient diffusion rates, sufficient pulp pressing results, a sufficient reduction in the growth of microorganisms and a sufficient prevention of sugarbeet pulp discoloration.

BRIEF DESCRIPTION OF THE INVENTION

Our invention is a method of producing sulfite-free sugarbeet fiber useful as a human dietary food supplement which comprises the steps of slicing a sugarbeet into a plurality of pieces and contacting the sugarbeet pieces with an effective sugar-extracting amount of a sulfite-free aqueous solution containing a non-sulfite antioxidant composition.

We have found that the sugar obtained by our method is of the same quality and quantity as the sugar obtained when sulfites are employed.

As utilized herein: (i) the term "sugarbeet" refers to the common beet Beta Vulgaris from which sugar is commercially extracted; (ii) the term "cossette" refers to the sugar-containing pieces of sugarbeet created by slicing a sugarbeet into a plurality of pieces; and (iii) the term "pulp" refers to the water insoluble, fiber-like material remaining after the extraction of sugar from cossettes.

DETAILED DESCRIPTION OF THE INVENTION INCLUDING A BEST MODE

The first step in extracting sugar from a sugarbeet is to clean the sugarbeet by removing soil and other foreign material. A useful method of cleaning the sugarbeet is to subject it to a high-pressure water spray and mechanical scrubbing. A substantial portion of the skin may also be removed during cleaning to increase the blandness of the final sugarbeet pulp product. Useful methods of removing the skin include high-pressure water spraying, mechanical peeling and steaming.

The cleaned sugarbeet is then cut into pieces to increase the surface area and facilitate processing. Most sugarbeet processing plants slice sugarbeets into long thin strips known as cossettes by forcing the cleaned sugarbeets through a beet slicer. For ease of extraction, sugarbeet cossettes are preferably smooth, of uniform thickness and have a minimum number of fines and slabs.

The sugarbeet cossettes are fed into a continuous diffuser or extractor in order to extract the sugar from the sugarbeet cossettes with warm water. The diffuser may be of several types, the preferred being a counter-current, sloped diffuser. The sugarbeet cossettes are propelled up the slope of a sloped diffuser by scrolls having perforated plate flights. The warm water enters at the top of the diffuser and percolates by gravity through the mass of sugarbeet cossettes. The water soluble portion of the cossettes, including the sugar, is extracted by the water by means of diffusion. Generally, the diffuser is heated with steam to increase the extraction efficiency.

The warm water containing the dissolved sugar and nonsugars is removed from the diffuser and undergoes various processing steps to yield crystalline sugar.

The following is a more detailed description of the sugarbeet structure and the diffusion process. The sugarbeet is composed of cells. In the cells, sugar-containing liquid is surrounded by protoplasm, which controls the diffusion of substances into and out of the cells. To allow extraction of the sugar, the proteins in the protoplasm are denatured by the application of heat or coagulating agents, rendering the protoplasm incapable of controlling diffusion. In practice, heat is typically used. Denaturing begins at temperatures above 50° C. and the time required depends upon the temperature and physical conditions of the sugarbeets.

The extraction of sugar from the cells follows the general laws of diffusion. The molecules of sugar diffuse gradually from regions of higher concentration to regions of lower concentration. The speed of diffusion depends upon the size of the diffusing particles and on the temperature and viscosity of the solution.

In the method of our invention, a sulfite-free aqueous solution containing a non-sulfite antioxidant compound and optionally other non-sulfite additives is used for the diffusion step. The non-sulfite antioxidant composition can include any antioxidant compound and/or additives which will not substantially adversely affect the yield or quality of the sugar, will not substantially adversely affect the yield or quality of the pulp, and will not substantially interfere with other aspects of sugarbeet processing. The antioxidant compositions useful in our process can inhibit browning of the sugarbeet pieces and pulp, inhibit deterioration and spoilage of the cossettes and pulp, and be used with typical sugarbeet processing equipment.

Preferred non-sulfite antioxidant compositions for use in the method of our invention include an antioxidant compound such as sodium erythorbate, araboascorbic acid, and mixtures thereof; and other additives such as trisodium citrate, citric acid, calcium chloride, and mixtures thereof. These compounds are readily available through commercial suppliers and are typically sold as fine powder, crystals or granules. Various grades and purities are available. We recommend use of food grade materials.

In a preferred method of our invention, the non-sulfite antioxidant composition is a mixture of sodium erythorbate, trisodium citrate, and calcium chloride. Preferably the non-sulfite antioxidant composition comprises about 72-78 wt-% sodium erythorbate, about 20-27 wt-% trisodium citrate, and about 1-5 wt-% calcium chloride.

In a second preferred method, the antioxidant composition comprises a mixture of araboascorbic acid, calcium chloride and citric acid. Preferably, the non-sulfite antioxidant composition comprises about 4-13 wt-% araboascorbic acid, about 1-2 wt-% calcium chloride, and about 83-95 wt-% citric acid.

In a third preferred method, the non-sulfite antioxidant composition is a mixture of citric acid and araboascorbic acid. Preferably, the non-sulfite antioxidant composition comprises about 85-95 wt-% citric acid and about 5-15 wt-% araboascorbic acid.

In the method of our invention, the non-sulfite antioxidant composition is in a sulfite-free aqueous solution used for sugar extraction and the sugarbeet cossettes are contacted with an effective sugar extracting amount of this solution. As previously noted, the solution is preferably warm to aid the diffusion process. The amount of solution needed to effectively extract the sugar will depend on many factors, including the total number and size of the sugarbeet cossettes and their surface area, the rate at which the sugarbeet pieces are propelled through the diffuser, the temperature and flow rate of the solution, and the contact time.

The quantity of non-sulfite antioxidant composition used in the method of our invention will be an amount sufficient to inhibit the growth of microorganisms, prevent significant browning of the cossettes or resulting pulp, and enhance diffusion in pulp pressing. In general, we have found that the concentration of the aqueous solution containing the antioxidant composition is from about 300 to 3,000 ppm, or preferably, for improved yet economical results, from about 300 to 500 ppm.

Where the previously described mixture of sodium erythorbate, trisodium citrate and calcium chloride is used, the preferred amount is 300 to 2,500 ppm, or most preferably, 300 to 2,000 ppm under typical conditions. Where the previously described mixture of araboascorbic acid, calcium chloride, and citric acid is used, the preferred amount is 300 to 3,000 ppm, or most preferably 300 to 2,000 ppm, under typical conditions. Where the previously described mixture of citric acid and araboascorbic acid is used, the preferred amount is 300 to 3,000 ppm, or most preferably, 300 to 500 ppm, under typical conditions.

The aqueous solution of non-sulfite antioxidant composition is typically formed by adding the antioxidant composition in powder, crystal or granular form to the diffuser water supply.

Contact time between the aqueous solution and the sugarbeet pieces, in our invention, is that time typically employed in sugarbeet processing. For example, the sugarbeet pieces can remain in the diffuser for anywhere from 60 to 90 minutes. From a production standpoint, it is desirable to process the sugarbeets as quickly as possible while achieving effective sugar removal.

The temperature at which our sulfite-free aqueous solution should typically be employed is that temperature at which the aqueous solution is typically employed in sugarbeet processing. Generally, a warm solution is preferred, to promote diffusion and dissolution of the sugar. Typically, the temperature will be in the range of 60°-80° C., or more preferably, for improved yield, about 70°-75° C. A temperature of 80° C. or above tends to result in poor pulp quality while a temperature below 60° C. results in a poor diffusion rate. Warm water, at about 65° C., is typically supplied to the diffuser and the diffuser itself is heated with steam to maintain the temperature.

After the extraction process is completed, the sugarbeet pieces, which are now "spent", and which we will refer to as pulp, are separated from the aqueous solution. This is often accomplished by the diffuser, for example, where the sugarbeet pieces are transported through the diffuser and ejected by means of intermission scrolls.

Generally, cleansing of the pulp for use as a human dietary food supplement begins after the sugarbeet pulp leaves the diffuser. Washing steps, conducted with washing apparatus, can occur after the sugarbeet pulp exits the diffuser but before pressing and drying. Methods and apparatus for washing of the pulp are described in detail in commonly assigned U.S. patent application Ser. No. 058,364, filed June 4, 1987 and now U.S. Pat. No. 4,770,886 and incorporated herein by reference.

After washing, the pulp is transferred to a pulp press where the moisture content of the sugarbeet pulp is reduced to about 70 to 80 wt%.

After pressing, the pulp can be transferred to a pulp dryer where its moisture content can be further reduced, for example, to less than 11 wt-%, or about 1 to about 11 wt-%, or preferably, to less than about 8 wt-%. The sugarbeet pulp may be dried in any of a number of conventional methods including air drying, oven drying, fluidized bed drying, etc.

The sugarbeet fiber can then be transferred to a grinder where it is milled into a soft, fine flour.

Our process, which permits processing of sugarbeets without use of sulfites, particularly during extraction where they typically have been used, results in sulfite-free pulp.

Because the final product is intended for human consumption, the equipment and surrounding environment must be kept clean and sanitized to avoid contamination of the sugarbeet pulp product. Further, the equipment must be constructed and designed so as to reduce the risk of contamination and should be made of a material which does not contribute an unpleasant color, taste or odor to the final product. An example of a suitable material is stainless steel.

EXAMPLE I

Beet slices obtained directly from a slicer were immersed in 1,470 ml. of an aqueous solution containing 1,875 ppm of a mixture of sodium erythorbate, trisodium citrate and calcium chloride maintained at 20° C.

No discoloration of the sugarbeet pieces was observed after overnight immersion in the solution at 20°-22° C.

One day later the sugarbeet pieces were drained, washed twice with water, and then dried overnight in an atmospheric oven set at 95° C.

The dried material was off-white but slightly darker and grayer than like material treated with sodium metabisulfite.

EXAMPLE II 189 lbs. of beets were sliced and processed through a slope-type, double screw diffuser. The diffuser water was heated to 50° C. and comprised 55 gallons of an aqueous solution containing 1,800 ppm of a mixture of d-araboascorbic acid, citric acid and calcium chloride.

The process yielded 12.5 lbs. of an off-white dietary fiber.

EXAMPLE III 228 lbs. of beets were sliced and processed through a slope-type double screw diffuser. The diffuser water comprised 52 gallons of an aqueous solution containing 2,500 ppm of a mixture of citric acid and d-araboascorbic acid. The pulp obtained from the diffuser was pressed in a pulp press and dried in a fluidized bed dryer.

The process yielded 87 lbs. of an off-white, dietary fiber.

The specification and Examples are presented to aid in a complete nonlimiting understanding of the invention. Since many variations and embodiments of the invention can be made without departing from the spirit and scope of the invention, the invention resides in the claims hereinafter appended.

I claim:

1. A method of producing sulfite-free sugarbeet pulp, said method comprising the steps of:
    (a) slicing a sugarbeet into a plurality of pieces; and,
    (b) contacting the sugarbeet pieces with an effective sugar extracting amount of a sulfite-free aqueous solution containing at least a food-grade non-sulfite antioxidant composition, so as to produce sugarbeet pulp suitable for human consumption;
        (i) said non-sulfite antioxidant composition comprising a non-sulfite antioxidant compound selected from the group consisting of sodium erythorbate, araboascorbic acid, and mixtures thereof;
        (ii) said non-sulfite antioxidant composition further comprising a non-sulfite additive selected from the group consisting of trisodium citrate, calcium chloride, citric acid, and mixtures thereof; and,
        (iii) said non-sulfite antioxidant composition including about 72 to 78 wt-% sodium erythorbate, about 20 to 27 wt-% trisodium citrate, and about 1 to 5 wt-% calcium chloride.

2. A method of producing sulfite-free sugarbeet pulp, said method comprising the steps of:
    (a) slicing a sugarbeet into a plurality of pieces; and,
    (b) contacting the sugarbeet pieces with an effective sugar extracting amount of a sulfite-free aqueous solution containing at least a food-grade non-sulfite antioxidant composition, so as to produce sugarbeet pulp suitable for human consumption;
        (i) said non-sulfite antioxidant composition comprising a non-sulfite antioxidant compound selected from the group consisting of sodium erythorbate, araboascorbic acid, and mixtures thereof;
        (ii) said non-sulfite antioxidant composition further comprising a non-sulfite additive selected from the group consisting of trisodium citrate, calcium chloride, citric acid, and mixtures thereof; and,
        (iii) said non-sulfite composition including about 85 to 95 wt-% citric acid and about 5 to 15 wt-% araboascorbic acid.

3. A method of producing sulfite-free sugarbeet pulp, said method comprising the steps of:
    (a) slicing a sugarbeet into a plurality of pieces; and,
    (b) contacting the sugarbeet pieces with an effective sugar extracting amount of a sulfite-free aqueous solution containing at least a food-grade non-sulfite antioxidant composition, so as to produce sugarbeet pulp suitable for human consumption;
        (i) said non-sulfite antioxidant composition comprising a non-sulfite antioxidant compound selected from the group consisting of sodium erythorbate, araboascorbic acid, and mixtures thereof;
        (ii) said non-sulfite antioxidant composition further comprising a non-sulfite additive selected from the group consisting of trisodium citrate, calcium chloride, citric acid, and mixtures thereof; and,
        (iii) said non-sulfite composition including about 4 to 13 wt-% araboascorbic acid, about 83 to 95 wt-% citric acid, and about 1 to 2 wt-% calcium chloride.

4. A method of producing sulfite-free sugarbeet pulp, said method comprising the steps of:
    (a) cleaning a sugarbeet;
    (b) slicing the sugarbeet into a plurality of pieces;
    (c) contacting the sugarbeet pieces with an effective sugar extracting amount of a sulfite-free aqueous solution containing at least a food-grade non-sulfite antioxidant composition so as to produce sugarbeet pulp suitable for human consumption;
        (i) said antioxidant composition comprising a non-sulfite antioxidant compound selected from the group consisting of sodium erythorbate, araboascorbic acid, and mixtures thereof;
  (ii) said non-sulfite antioxidant composition further comprising a non-sulfite additive selected from the group consisting of trisodium citrate, calcium chloride, citric acid, and mixtures thereof; and,
  (iii) said non-sulfite antioxidant composition including about 72 to 78 wt-% sodium erythorbate, about 20 to 27 wt-% trisodium citrate and about 1 to 5 wt-% calcium chloride;
(d) separating the pulp from the sulfite-free aqueous solution;
(e) washing the pulp;
(f) pressing the pulp; and,
(g) drying the pulp.

5. A method of producing sulfite-free sugarbeet pulp, said method comprising the steps of:
(a) cleaning a sugarbeet;
(b) slicing the sugarbeet into a plurality of pieces;
(c) contacting the sugarbeet pieces with an effective sugar extracting amount of a sulfite-free aqueous solution containing at least a food-grade non-sulfite antioxidant composition so as to produce sugarbeet pulp suitable for human consumption;
  (i) said antioxidant composition comprising a non-sulfite antioxidant compound selected from the group consisting of sodium erythorbate, araboascorbic acid, and mixtures thereof;
  (ii) said non-sulfite antioxidant composition further comprising a non-sulfite additive selected from the group consisting of trisodium citrate, calcium chloride, citric acid, and mixtures thereof; and,
  (iii) said non-sulfite antioxidant composition including about 85 to 95 wt-% citric acid and about 5 to 15 wt-% araboascorbic acid;
(d) separating the pulp from the sulfite-free aqueous solution;
(e) washing the pulp;
(f) pressing the pulp; and,
(g) drying the pulp.

6. A method of producing sulfite-free sugarbeet pulp, said method comprising the steps of:
(a) cleaning a sugarbeet;
(b) slicing the sugarbeet into a plurality of pieces;
(c) contacting the sugarbeet pieces with an effective sugar extracting amount of a sulfite-free aqueous solution containing at least a food-grade non-sulfite antioxidant composition so as to produce sugarbeet pulp suitable for human consumption;
  (i) said antioxidant composition comprising a non-sulfite antioxidant compound selected from the group consisting of sodium erythorbate, araboascorbic acid, and mixtures thereof;
  (ii) said non-sulfite antioxidant composition further comprising a non-sulfite additive selected from the group consisting of trisodium citrate, calcium chloride, citric acid, and mixtures thereof; and,
  (iii) said non-sulfite antioxidant composition including about 4 to 13 wt-% araborascorbic acid, about 83 to 95 wt-% citric acid and about 1 to 2 wt-% calcium chloride;
(d) separating the pulp from the sulfite-free aqueous solution;
(e) washing the pulp;
(f) pressing the pulp; and,
(g) drying the pulp.

7. A method of producing sulfite-free sugarbeet pulp, said method comprising the steps of:
(a) cleaning a sugarbeet;
(b) slicing the sugarbeet into a plurality of cossettes;
(c) contacting the sugarbeet pieces with an effective sugar extracting amount of a sulfite-free aqueous solution comprising 300 to 3,000 ppm of a food-grade non-sulfite antioxidant composition for 60 to 90 minutes so as to produce sugarbeet pulp suitable for human consumption, the sulfite-free aqueous solution having a temperature of about 60° C. to 80° C.;
  (i) said non-sulfite antioxidant composition comprising a non-sulfite antioxidant compound selected from the group consisting of sodium erythorbate, araboascorbic acid, and mixtures thereof;
  (ii) said non-sulfite antioxidant composition further comprising a non-sulfite additive selected from the group consisting of trisodium citrate, calcium chloride, citric acid, and mixtures thereof; and,
  (iii) said non-sulfite antioxidant composition including about 72 to 78 wt-% sodium erythorbate, about 20 to 27 wt-% trisodium citrate, and about 1 to 5 wt-% calcium chloride;
(d) separating the pulp from the sulfite-free aqueous solution;
(e) washing the pulp;
(f) pressing the pulp; and,
(g) drying the pulp to reduce the moisture content of the pulp to less than about 11 wt-%.

8. A method of producing sulfite-free sugarbeet pulp, said method comprising the steps of:
(a) cleaning a sugarbeet;
(b) slicing the sugarbeet into a plurality of cossettes;
(c) contacting the sugarbeet pieces with an effective sugar extracting amount of a sulfite-free aqueous solution comprising 300 to 3,000 ppm of a food-grade non-sulfite antioxidant composition for 60 to 90 minutes so as to produce sugarbeet pulp suitable for human consumption, the sulfite-free aqueous solution having a temperature of about 60° C. to 80° C.;
  (i) said non-sulfite antioxidant composition comprising a non-sulfite antioxidant compound selected from the group consisting of sodium erythorbate, araboascorbic acid, and mixtures thereof;
  (ii) said non-sulfite antioxidant composition further comprising a non-sulfite additive selected from the group consisting of trisodium citrate, calcium chloride, citric acid, and mixtures thereof; and,
  (iii) said non-sulfite antioxidant composition including about 85 to 95 wt-% citric acid and about 5 to 15 wt-% araboascorbic acid;
(d) separating the pulp from the sulfite-free aqueous solution;
(e) washing the pulp;
(f) pressing the pulp; and,
(g) drying the pulp to reduce the moisture content of the pulp to less than about 11 wt-%.

9. A method of producing sulfite-free sugarbeet pulp, said method comprising the steps of:
(a) cleaning a sugarbeet;
(b) slicing the sugarbeet into a plurality of cossettes;
(c) contacting the sugarbeet pieces with an effective sugar extracting amount of a sulfite-free aqueous solution comprising 300 to 3,000 ppm of a food-grade non-sulfite antioxidant composition for 60 to 90 minutes so as to produce sugarbeet pulp suitable for human consumption, the sulfite-free aqueous solution having a temperature of about 60°;0 C. to 80° C.;
  (i) said non-sulfite antioxidant composition comprising a non-sulfite antioxidant compound selected from the group consisting of sodium erythorbate, araboascorbic acid, and mixtures thereof;
  (ii) said non-sulfite antioxidant composition further comprising a non-sulfite additive selected from the group consisting of trisodium citrate, calcium chloride, citric acid, and mixtures thereof; and,
  (iii) said non-sulfite antioxidant composition including about 4 to 13 wt-% araboascorbic acid, about 83 to 95 wt-% citric acid, and about 1 to 2 wt-% calcium chloride;
(d) separating the pulp from the sulfite-free aqueous solution;
(e) washing the pulp;
(f) pressing the pulp; and,
(g) drying the pulp to reduce the moisture content of the pulp to less than about 11 wt-%.

10. A method of producing sulfite-free sugarbeet pulp, said method comprising the steps of:
(a) providing sugarbeet pieces; and,
(b) treating the sugarbeet pieces with an effective sugar-extracting amount of a sulfite-free aqueous solution containing a food-grade non-sulfite antioxidant composition;
  (i) said non-sulfite antioxidant composition comprising a non-sulfite antioxidant compound selected from the group consisting of sodium erythorbate, araboascorbic acid, and mixtures thereof;
  (ii) said non-sulfite antioxidant composition further comprising a non-sulfite additive selected from the group consisting of trisodium citrate, calcium chloride, citric acid, and mixtures thereof; and,
  (iii) said antioxidant composition including sodium erythorbate, trisodium citrate, and calcium chloride.

11. A method of producing sulfite-free sugarbeet pulp, said method comprising the steps of:
(a) providing sugarbeet pieces; and,
(b) treating the sugarbeet pieces with an effective sugar-extracting amount of a sulfite-free aqueous solution containing a food-grade non-sulfite antioxidant composition;
  (i) said non-sulfite antioxidant composition comprising a non-sulfite antioxidant compound selected from the group consisting of sodium erythorbate, araboascorbic acid, and mixtures thereof;
  (ii) said non-sulfite antioxidant composition further comprising a non-sulfite additive selected from the group consisting of trisodium citrate, calcium chloride, citric acid, and mixtures thereof; and,
  (iii) said antioxidant composition including araboascorbic acid, citric acid, and calcium chloride.

* * * * *